(No Model.)

F. O. BLACKWELL.
SIDE GUARD FOR VEHICLES.

No. 493,327. Patented Mar. 14, 1893.

WITNESSES:

INVENTOR:
Francis O. Blackwell
by Bakewell & Knight
ATTYS.

UNITED STATES PATENT OFFICE.

FRANCIS O. BLACKWELL, OF BOSTON, MASSACHUSETTS.

SIDE GUARD FOR VEHICLES.

SPECIFICATION forming part of Letters Patent No. 493,327, dated March 14, 1893.

Application filed April 8, 1891. Serial No. 388,142. (No model.)

*To all whom it may concern:*

Be it known that I, FRANCIS O. BLACKWELL, a citizen of the United States, residing at Boston, in the county of Suffolk and State of Massachusetts, have invented a certain new and useful Improvement in Side Guards for Vehicles, of which the following is a specification.

My invention relates to guards or gates for side entrance vehicles for preventing the entrance or exit of passengers on the inner side, next the other track in a double track railway, and the said invention consists in providing such a car with removable or opening gates or guards on both sides of the car and means for opening or closing the same, so as to always present an inner closed guard and an outer open guard. With those vehicles which have reversible or throw-over seat backs, the gates may be operated by reverse connections from the seat backs.

Figure 1:
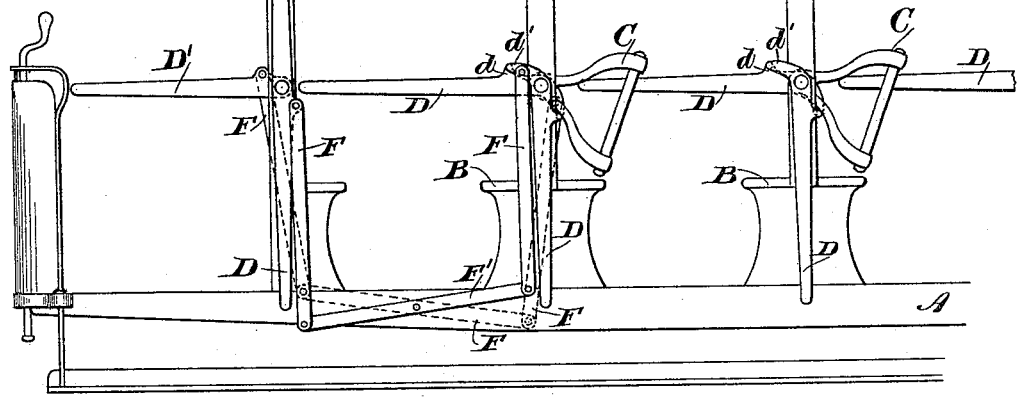
Figure 2:
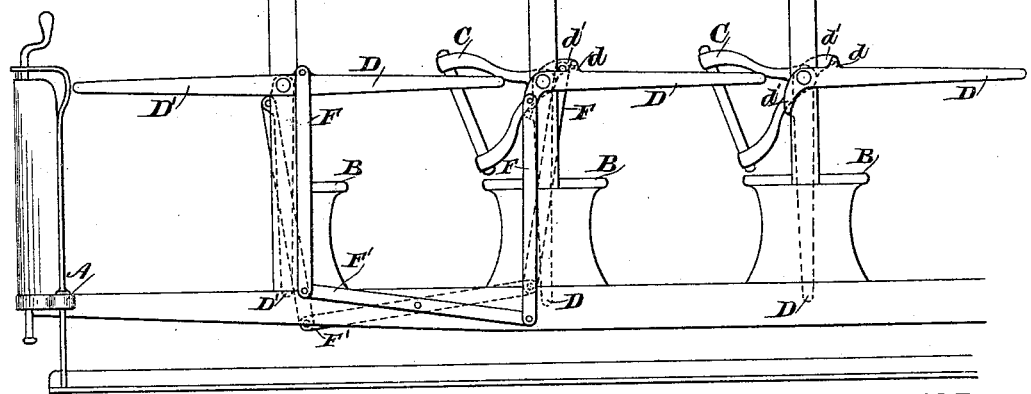
Figure 3:
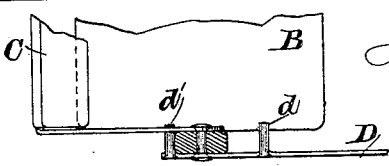

In the accompanying drawings, Figures 1 and 2 are similar side elevations of a side entrance street car provided with my removable gates, the same being shown in reverse positions in the said two figures. Fig. 3 is a detail view of the operating connection from the seat back to the gate.

A represents a side entrance vehicle, here shown as a street car, provided with seats B and reversible or throw-over seat backs C. The side guards which I provide consist first of gates or swinging arms D pivoted to the car posts, and adapted to swing into position to close the entrances to the car between the seats or to swing down or drop to open the same. Each gate has two pins $d$, $d'$ which are engaged by the arms at the corresponding seat back, the pins being reversely arranged on the opposite sides of the car, so that when the seat back is thrown over from one side to the other it engages with pin $d$ on the gate D on one side and depresses it, at the same time lifting the gate on the other side, through the pin $d'$, thus moving the gates from the position of Fig. 1 to that of Fig. 2 or vice versa.

The end gate D' may be operated by connection with the next gate, as shown, through the parallel motion links F and levers F'.

By side entrance vehicles I mean those which may be entered or left from the sides as in the ordinary open street car.

What I claim as new, and desire to secure by Letters Patent, is—

1. In a side entrance vehicle the gates or removable guards on both sides thereof having reversely operating connections, substantially as and for the purpose described.

2. The combination with a side entrance vehicle, of the removable guards or gates on both sides thereof, and the operating device for said gates reversely connected to the gates on the opposite sides of the vehicle.

3. The combination with a side entrance vehicle, having tilting seat backs, of the removable gates or guards therefor, having operating connection with said backs.

4. The combination with the side entrance vehicle having tilting seat backs, of the removable guards or gates on the opposite sides thereof, having reverse operating connections with said seat backs.

In testimony whereof I have hereto set my hand.

FRANCIS O. BLACKWELL.

Witnesses:
JOHN W. GIBBONEY,
ELIHU THOMSON.